June 19, 1923.  
E. A. POWELL  
STOCK WATERING DEVICE  
Filed Feb. 24, 1922  
1,459,293
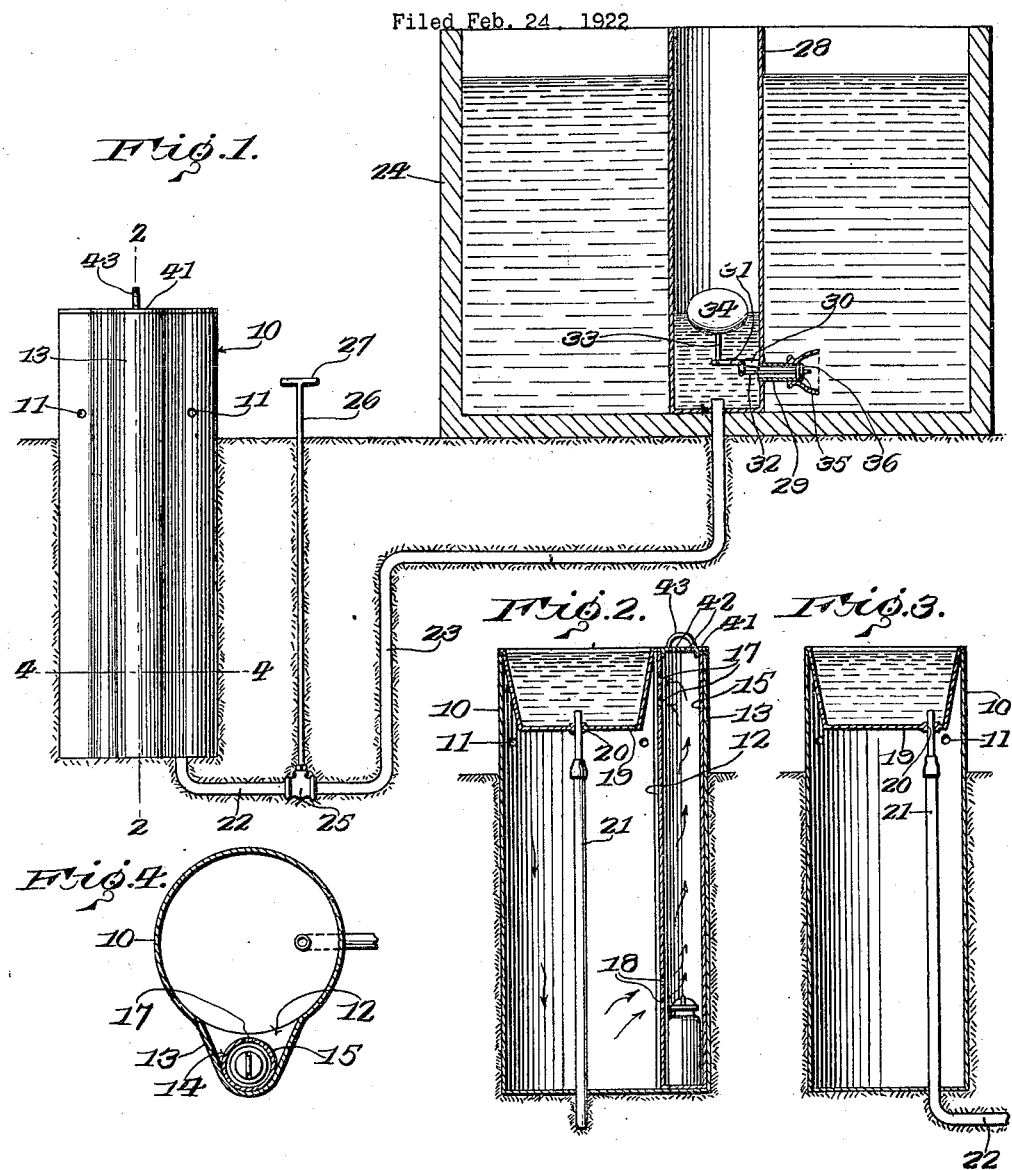
Inventor  
Ernest A. Powell  
Attorney Patented June 19, 1923.

1,459,293

UNITED STATES PATENT OFFICE.

ERNEST A. POWELL, OF RAWSON, OHIO.

STOCK-WATERING DEVICE.

Application filed February 24, 1922. Serial No. 538,933.

*To all whom it may concern:*

Be it known that I, ERNEST A. POWELL, a citizen of the United States, residing at Rawson, in the county of Hancock, State of Ohio, have invented certain new and useful Improvements in Stock-Watering Devices; and I do hereby declare the following to be a full, clear, and exact description of the invention, such as will enable others skilled in the art to which it appertains to make and use the same.

This invention relates to new and useful improvements in drinking fountains, and particularly to stock drinking fountains.

One object of the invention is to provide a novel and improved device of this character wherein the fountain is provided with a constant supply of clear fresh water.

Another object is to provide a novel and improved device of this character wherein the water can be maintained at a temperature which will prevent the same freezing, thus permitting the stock to have fresh and moderately tempered water at all times.

Another object resides in the provision of a novel and improved heating device which is readily and easily inserted and removed.

Other objects and advantages will be apparent from the following description when taken in connection with the accompanying drawing.

In the drawing:

Figure 1 is an elevation of the stock watering fountain and one form of supply tank, the ground being shown in section.

Figure 2 is a vertical longitudinal sectional view through the device, on the central line 2—2 of Figure 1.

Figure 3 is a vertical longitudinal central sectional view taken on a line passing through a plane at right angles to that of Figure 2.

Figure 4 is a horizontal sectional view on the line 4—4 of Figure 1, through the casing and lamp holding casing.

Referring particularly to the accompanying drawings, 10 represents a cylindrical casing which is sunk in the ground, to such a depth that only a small portion thereof extends above the ground level. In the portion of the casing which extends above the ground level there are formed the series of ventilating openings 11, for the escape of excess heat and the products of combustion from the heat source which will be mentioned later herein. In one side of the casing 10, and extending the entire length thereof, is an opening 12, and secured to the outer face of the cylinder, at opposite sides of the opening, are the longer marginal edges of an outwardly curved plate 13, between which, and the wall of the casing 10, is formed the chamber 14. Disposed removably in the chamber 14 is an elongated casing 15, in the lower end of which is supported the heating lamp 16. In the upper and lower portions of the inner wall of the casing 15 are the openings 17 and 18, for permitting circulation of air. It will be noted that the casing 15 extends upwardly to the upper end of the casing 10. Seated within the upper end of the casing 10 is the drinking bowl 19, the bottom of the bowl having an opening 20 for the passage therethrough of the water supply pipe 21. This pipe 21 extends vertically through the casing 10, from a point slightly below the lower end of the casing 10, or below the frost line, and is connected thereat with a horizontal section of pipe 22, which in turn is connected with a second vertical pipe 23, extending above the ground, outside of the casing 10, and connected to a source of water supply, which may be the tank 24 or 24', or a city or town pressure system, the latter not being shown. In the horizontal pipe 22 there is disposed a control valve 25, the stem 26 of which extends upwardly through the ground where it is provided with a handle 27 for turning the valve.

In the tank 24 is a vertical tube 28, and extending from the lower portion thereof is a horizontal pipe 29, through which water passes, from the tank to the tube, and thence out through the pipe 23, which is connected in the bottom of the tank, within the lower end of the tube 28. A bracket 30 is carried by the side wall of the tube 28, and extends inwardly above the pipe 29, and pivotally mounted on this bracket is a bell crank lever 31, one arm being pivotally connected with the valve stem 32, and the other arm being pivotally connected with the stem 33, of the ball float 34. The pipe 29 is formed with a valve seat 35 for the valve 36 of the stem 32. The level of the water in the tube 28 is maintained by the float and valve to correspond to that of the water in the bowl, and when the water level in the bowl falls below the proper degree the water level in the tube 28 will correspondingly fall and lower the float so that the valve 36 will be opened and water permitted to flow to the bowl.

The casing 15 is provided with a cover 41, formed with perforations 42, for permitting the escape of the excess of the smoke and gases, from the lamp, and is also provided with a handle 43, which is grasped to withdraw the casing from the chamber 14, when the lamp needs filling or repairs.

What is claimed is:

1. A stock watering device comprising a casing partially sunken in the ground with vent openings in the portion above the surface of the ground, the casing having a longitudinal offset chamber in one side with a longitudinal opening establishing communication with the casing, a water receptacle seated within the upper end of the casing and having its walls spaced from the walls of the casing, a water conduit extending longitudinally through the casing and into the bottom of the receptacle, a casing disposed in and filling the said chamber and having openings in the upper and lower portions of its inner wall leading into the casing, and a heating means in the bottom of the second casing.

2. A stock watering device comprising a casing sunken in the ground and having an offset chamber in one side extending the length thereof and perforations in the portion of the casing which extends above the ground, a removable casing in the offset chamber, the second casing having a heating source in the lower end and air openings in its side communicating with the first casing, and a float actuated water supplying means for maintaining a constant level of water in the water receptacle located in the upper end of the first casing.

In testimony whereof, I affix my signature, in the presence of two witnesses.

ERNEST A. POWELL.

Witnesses:
 ALVA J. RUSSELL,
 D. CLELA RUSSELL.